(12) United States Patent
Whellock

(10) Patent No.: US 7,985,324 B2
(45) Date of Patent: Jul. 26, 2011

(54) PLASMA TREATMENT OF FLY ASH FROM COAL COMBUSTION TO IMPROVE ITS MARKETABILITY

(75) Inventor: John G. Whellock, Centennial, CO (US)

(73) Assignee: Matrix LLC, Castle Rock, CO (US)

(*) Notice: Subject to any disclaimer, the term of this patent is extended or adjusted under 35 U.S.C. 154(b) by 952 days.

(21) Appl. No.: 11/974,905

(22) Filed: Oct. 16, 2007

(65) Prior Publication Data

US 2008/0142356 A1 Jun. 19, 2008

Related U.S. Application Data

(60) Provisional application No. 60/852,318, filed on Oct. 17, 2006.

(51) Int. Cl.
*B01J 19/08* (2006.01)
*C09C 1/56* (2006.01)

(52) U.S. Cl. .................. 204/164; 204/173; 423/460

(58) Field of Classification Search .................. 204/164, 204/173; 423/460
See application file for complete search history.

(56) References Cited

U.S. PATENT DOCUMENTS

| | | | |
|---|---|---|---|
| 4,115,256 A | 9/1978 | de Zeeuw | |
| 4,663,507 A | 5/1987 | Trerice | |
| 4,952,140 A | 8/1990 | Dodson | |
| 5,492,677 A | 2/1996 | Yoshikawa | |
| 5,935,538 A | 8/1999 | Tabatabaie-Raissi et al. | |
| 6,077,494 A | 6/2000 | Gasiorowski et al. | |
| 6,136,089 A | 10/2000 | Hurt et al. | |
| 6,228,149 B1 | 5/2001 | Alenichev et al. | |
| 6,395,145 B1 | 5/2002 | Altman | |
| 6,521,037 B1 | 2/2003 | Hurt et al. | |
| 6,564,472 B1 | 5/2003 | Dodson | |
| 6,599,358 B1 | 7/2003 | Boggs | |
| 6,746,654 B2 | 6/2004 | Mehta et al. | |
| 6,890,507 B2 | 5/2005 | Chen et al. | |
| 6,945,179 B2 | 9/2005 | Ramme et al. | |
| 7,416,646 B2 * | 8/2008 | Altman et al. | ................. 204/164 |

(Continued)

FOREIGN PATENT DOCUMENTS

WO 02097330 A1 12/2002

(Continued)

OTHER PUBLICATIONS

Hurt et al., Strategies and Technology for Managing High-Carbon Ash. Final Technical Report Issued Feb. 13, 2004. 65 pages. DOE Award No. DE-FG26-OONT40907. Department of Energy. Office of Scientific and Technical Information. http://www.osti.gov/bridge/servlets/purl/833642-OMk7AA/native/833642.pdf.

*Primary Examiner* — Kishor Mayekar
(74) *Attorney, Agent, or Firm* — Marsh Fischmann & Breyfogle LLP

(57) ABSTRACT

A system and method for treating unmarketable fly ash and improve its properties as an additive for concrete is disclosed. The method includes the steps of creating a gas stream containing ionized air through a plasma reactor and exposing an amount of fly ash containing carbon to the ionized air while in the reactor. The exposure of the carbon to the ionized air promotes the attachment of the ions to the carbon to reduce the adsorption capacity of the carbon.

3 Claims, 12 Drawing Sheets

U.S. PATENT DOCUMENTS

| | | |
|---|---|---|
| 2003/0066461 A1 | 4/2003 | Chen et al. |
| 2003/0206843 A1 | 11/2003 | Nelson, Jr. |
| 2005/0075236 A1 | 4/2005 | Ramme et al. |
| 2007/0057411 A1 | 3/2007 | Williams et al. |
| 2009/0200156 A1 | 8/2009 | Whellock |
| 2009/0314185 A1 | 12/2009 | Whellock |

FOREIGN PATENT DOCUMENTS

| | | |
|---|---|---|
| WO | 2008048659 A2 | 4/2008 |

* cited by examiner

UV QUARTZ REACTOR

PLASMA TREATMENT OF FLY ASH FROM COAL COMBUSTION TO IMPROVE ITS MARKETABILITY

REFERENCE TO RELATED APPLICATIONS

This application claims the benefit of my provisional application having Ser. No. 60/852,318, filed Oct. 17, 2006, now abandoned, and includes much of the same material disclosed in my co-pending application filed on even date herewith, titled "Treatment of Fly Ash From Coal Combustion to Improve Its Marketability."

BACKGROUND OF THE INVENTION

1. Field of Application

Coal combustion fly ash has been marketed for a variety of applications. The addition of fly ash to cement is an expanding industry and accounts for a huge opportunity for the coal burning power plants to defray operating costs for disposal. However if the ash does not meet certain guidelines in terms of residual carbon; or has surfactant adsorption problems-measured in terms of a foam index; or contains ammonia, the fly ash is not only unusable but becomes a disposal problem. This application is concerned with ways and means to treat unmarketable fly ash and improve its properties, use and value. It is of great importance to the power, cement and construction industries.

2. Description of Known Art

Fly ash derived from power plants is frequently used in the production of concrete. According to the relevant ASTM requirements, fly ash may replace cement in concrete up to 5-10%.

Generally speaking if the carbon in the fly ash were less than 3% w/w (usually measured as loss in ignition or LOI, which closely correlates with the carbon content) it would be marketable. This is common with the C class ashes, which are generally from sub-bituminous coals. Quite often the bituminous coals, which lead to F class ashes, have much higher carbon levels and may in any event be unmarketable unless the carbon is burned out or removed by a separation process.

In the preparation of concrete known as "ready mix" air-entraining agents are used to allow the introduction of micro bubbles into the concrete. These micro bubbles aid in the control of expansion and contraction of the concrete as occurs with freeze and thaw in the environment. Too much air entrained in the concrete reduces strength and too little results in poor adaptation to the above weathering impacts. Many of the ashes can have a seemingly low carbon or LOI level and yet have a problem with the quantity of surfactant required to entrain micro bubbles. It has been determined that it is the carbonaceous residual in fly ash impacts the adsorption of surfactants. This carbon has a high surface area and is very active towards the so-called air entraining agents.

The normal cause of the problem with the fly ash is: low and ultra low NOx burner systems starve the combustion of the coal in the primary firing zone and then add over-fire air to complete oxidation. While minimizing NOx formation these conditions can create higher levels of condensed organic carbonaceous intermediates or soot in or on the fly ash, as well as incompletely combusted particles of (devolatilized) coal. They are effectively incomplete combustion products of the carbon. The remaining mineral matter then has a significant quantity of both coarse (−50 microns) and nano-particulate carbon intermingled with it. This material has a tendency to adsorb the surfactants or air entraining agents causing a high "foam index" and it is thought that it is the finer particles that create most of the problem. This high foam index relates to the number of drops of a standard surfactant that is added to a known quantity of fly ash under controlled conditions. A high foam index material requires much more surfactant than normally necessary.

It is not often clear whether the cause of the high foam index is the reducing conditions in the combustion zone, the residence time of solids in the gas phase, or the load on the boiler unit. It is most probably a function of the specific surface area per unit volume of the carbon, which is related inversely to the particle size (diameter). These effects are not fully understood. Suffice it to say, there are many plants that have this problem with their fly ash. They are struggling to find a solution to overcome the issue so the ash may be sold rather than disposed. Additionally, the situation is worsened by the lack of knowledge of the correlation with the potential causes and the variability of the foam index value. It will be clear to the reader that the variable nature of the foam index will lead to an unknown or un-quantifiable amount of air entraining agent—one minute the amount added if constant might be too much and the next too little.

Another problem with fly ash arises from the presence of ammonia. If too high a concentration is present in the fly ash it may release upon addition of water and the other cement components leading to deleterious environmental consequences. Emission of ammonia is not only unpleasant in closed-in working environments; it is also toxic in high enough concentrations.

Ammonia in fly ash from power plants is created by the injection of ammonia to remove NOx. This technique is employed with Selective Catalytic Reduction (SCR) units. These control devices employ special catalysts, which combine ammonia with NOx components and form harmless nitrogen and water. Some stoichiometric excess is needed to assure the removal of the NOx, but over-injection creates ammonia "slip", as it is referred to, which results in high local concentrations of the undesirable component adsorbed onto the particulates (or fly ash) in the gas stream. A material so affected is difficult to sell into the concrete market.

These two problems occur in fly ash resulting from coal burning power plants where there are emission control features installed on the boilers. There are innumerable cases where there is need for correction of the either of the two issues and sometimes both on the same plant.

Thermal oxidation is a process that can remove both the ammonia and the carbon foam index issue. Indeed, carbon burn out facilities have been constructed that will take the carbon content and burn it to a low level and it is known that the foam index problem is destroyed under these circumstances. Temperatures for such processes are generally in the region of 700-850° C. Ammonia is also broken down by thermal oxidation means and this can take place at lower temperatures around 350 to 500° C.

Where the foam index issue has to be addressed without real burnout of the carbon (usually because there is insufficient to provide combustible heat release of any magnitude) the foam index can be ameliorated or lessened by thermal treatment at temperatures as low as 400° C. but generally more like 700° C. Naturally the requirement to heat up the fly ash to any of these temperatures results in the expenditure of quite a lot of energy or fuel. Some of this can of course be recovered in the gas stream to preheat the feed air for the combustion process, but nevertheless the demand for fuel is quite significant.

For the treatment of foam index problems, Hurt et al U.S. Pat. Nos. 6,136,089 and 6,521,037 have proposed and patented the use of ozone. This has the advantage of being applied at low temperatures negating the fuel requirements of a truly thermal or combustion process. The dosage rates are relatively high, though, and the use of ozone has an energy demand of its own. First, the production of ozone is inefficient due to side reactions and the overall power required for a reasonable concentration is quite significant. Secondly, ozone is made from an air stream or an oxygen stream or a mixture of both—but the gas must be almost completely dry (free of water). The generally known conditions for its production are a low dew point of −40° C. or lower in the gas stream, as it is unstable in moist air. Hence, an important part of the power consumed in its generation comes from the drying of the air stream to low dew points. Alternatively, oxygen may be used (which has an inherently low dew point due to the manufacturing processes—from cryogenics or pressure swing methods both of which eliminate water from the gas as an early step in the process chain). However, the power for production of oxygen has to be taken into account—this can range from about 200-400 kWh/ton. Oxygen enables higher concentrations of ozone to be made. Ozone made from oxygen can, for example, be as high as 1-6% w/w. Whereas the concentration level is significantly lower with air perhaps 200 ppm to 5,000 or 10,000 ppm.

The reaction, which produces ozone from a corona discharge in air or oxygen, is quite endothermic. The inefficiencies in the process lead to the release of energy as heat. This heat must be removed from the gas during production. If this heat is not removed, by a cooling circuit, the ozone breaks down—and effectively the product concentration is lowered significantly. The cost associated with the cooling duty is an additional power load and is often not figured in the production cost of ozone generators. This is the third source of cost.

Lastly, the capital cost of ozone generators is significant, as they require close tolerance in manufacture for fitting the dielectric inserts and electrodes within the tubular arrays in a concentric manner. This impacts the overall operating cost in terms of depreciation charges.

The power associated with production is in the range of 9 to 18 kWh/kg of ozone: this, coupled with the relatively high dosage rate required for fly ash treatment, can make this quite an expensive proposition.

Hurt et al identified the conditions for use of the gas to oxidize the carbonaceous material on some fly ash materials tested. To achieve the desired effect for foam index reduction, dosage ranges from 0.5 to 2 or 3 g of ozone/kg of fly ash. Ozone is toxic and needs to be utilized fully or broken down into atmospheric oxygen after the atomic oxygen has taken part in the reaction step. This in itself requires very careful management of the contacting and dosage rate or a back up catalytic breakdown system using manganese dioxide or thermal treatment to about 300° C. At the latter temperature, the residual ozone is reduced to negligible levels.

The authors also elaborated on the mechanism and noted that the actual LOI figure increased with the ozone application. This implies a different mechanism from a breakdown of carbonaceous material into components such as carbon dioxide and water vapor unless they are still held as by-products on the surface.

In international patent WO 02/097330 A1J.M, Tranquilla discloses the use of a microwave reactor together with a carbon-free material and oxygen contacting for reduction for the carbon content in high carbon fly ash. However, the operating temperatures employed with the technique are above 600° C., which leads to the expenditure of significant microwave energy for its attainment. This is, therefore, a variant on a high temperature process for burnout of carbon in fly ash. While this process reduces the carbon content significantly, it is not specifically targeted at lowering the foam index or ammonia removal. The low temperature and energy requirement is the stated objective of this present application.

Another form of energy that has been applied to accelerate reactions and, in particular, oxidations in the field of organic chemistry and wastewater treatment is ultraviolet radiation. However, this has insufficient energy, at close to ambient temperatures, to engage in burnout processes. It also requires relatively accessible surfaces, high surface area, thin layers of material, if the material is solid, or rapid material exchange within the body of the material to be effective.

Other inventors have sought to utilize chemical injection or spray treatment to modify the surface of the fly ash and passivate the fly ash surfactant demand. While this is a low temperature application, which minimizes the energy and is applied to dry fly ash, it has possible future unpredictable consequences for the concrete. Dosing and application rate are a practical issue, which are difficult to control with material that is being transferred at high rate into tankers for dispatch. Generally there is poor penetration into the heart of the flowing mass. The chemicals themselves are potentially hazardous if spilled in transit and are often aliphatic or aromatic carboxylic acids and their salts—see U.S. Pat. No. 6,599,358.

SUMMARY OF THE INVENTION

The present application seeks to beneficiate a variety of different coal burning power plant fly ash materials that either have a high foam index problem or are contaminated with ammonia or a combination of these issues and are not marketable into the cement/concrete industry. It also seeks to overcome the shortcomings of the aforementioned methods and provide a safe, economical method of treatment of ash.

In the methodology of the present application, a surface blocking mechanism is employed that minimizes the energy requirements for processing the ash. It does not require heating. The treatment only modifies superficial layers of the fly ash while the gaseous agent itself has a half-life that is measured in seconds or at most minutes. Fly ash is a commodity and cannot stand high costs in processing to bring it into a marketable state. Accordingly, what is proposed in this application is specifically a low cost method of upgrading the ash merely by localized surface treatment of the offending carbon. The unique aspect of the application is the careful administration of ionized air generated from ambient humid air for ionic treatment of the surface of the carbon utilizing a contacting method and environment operating at, or close to, ambient temperature. (Air is specifically mentioned due to its low cost, although oxygen or oxygen-enriched air may be used, provided there is sufficient humidity in it). Thus, the operational cost of heating material and the associated capital cost of thermal equipment is avoided.

| | Dosage g/kg of fly ash Ionized Air | | | | | | | |
|---|---|---|---|---|---|---|---|---|
| | 0.004 | | 0.39 | | 0.77 | | 1.55 | |
| Method | Input | Output | Input | Output | Input | Output | Input | Output |
| Foam Index Reduction | 95 | 70 | 95 | 30 | 100 | 25 | 95 | 15 |
| | 26.3% | | 68.4% | | 75.0% | | 84.2% | |

| | Dosage g/kg of fly ash Ozone | | | | | | |
|---|---|---|---|---|---|---|---|
| | 0.31 | | 0.61 | | 1.22 | | |
| Method | Input | Output | Input | Output | Input | Output | 3.06 |
| Foam Index Reduction | 95 | 85 | 105 | 80 | 105 | 90 | 95 80 |
| | 10.5% | | 23.8% | | 14.3% | | 15.7% |

An example of foam index treatment on a specific C-type fly ash is given below. The initial foam index was successfully reduced by ionized ambient air having a relative humidity of approximately 50% by the following amounts:

It should be noted that the target of foam index in this particular case is approximately 30. (In some instances, the measurements are made in milliliters rather than drops, as shown) However, the relative reduction is the indicator of the efficiency. For ionized air, the dosage rate reflects the equivalent ionic oxidizing power in g per kg of ash. Whereas with ozone it is the actual grams of $O_3$ passed through so many grams of sample—expressed as g/kg.

While there is some scatter in the results with dry ozone, it should be noted that on the same material and weight treated, the ozone tests did not achieve more than 24% reduction at a dose of 0.61 g/kg and never reached the desired reduction of around 70% even at much higher dosage rates up to 3.1 g/kg. By contrast, the ionized air reached the targeted value (30 drops) with only 0.39 g/kg—one eighth of the concentration of ozone, which in the highest dosage only reached 15.7% reduction (to 80 drops). Comparing the lightest dose of ionized air (0.004) against the heaviest of ozone (3.06) indicates the ability to exceed the performance of ozone on this material with over 700 times lower dosage.

To demonstrate whether there was a long-term effect of ionized air, a number of samples that were previously treated and retained for a year were retested for foam index. These samples had lower or similar foam index results, demonstrating that there was perhaps a permanent change or at least a long-term effect on the material, sufficient to assure its marketability. However, a sample treated with ozone, tested a year later, did not show the same effect.

The fly ash material needs to be tested to establish dosing rates and in certain cases dosage may be increased to treat material that has both foam index and high ammonia.

The disclosed system and method seeks to avoid a number of the issues noted with the above prior art in the following way:

Compared with Thermal Routes—
  No fuel and much less overall energy is anticipated for the new process
  The system can be applied with relatively simple gas/solid contactors without special construction requirements Compared with the Ozone Route—
  No expensive drying system to low dew points is needed
  Some residual moisture level in the gas or the solid is an advantage
  Humid or ambient air may be utilized (or oxygen but only to speed up the effect)
  Dosage rates are one to two orders of magnitude less than with ozone
  The toxic excess is totally eliminated or greatly reduced
  No expensive break down system or use of heat is required for excess reactant
  The system will work with both FI (foam index) problems and ammonia
  The final breakdown products are innocuous Furthermore, if compared to some of the proposed options for introducing special. Special surfactant-modifying chemicals, which incidentally have undergone no long term monitoring of their effect on resultant concrete properties, the technique leaves no registerable by-products or modifying chemicals. It has a short life in its effect and the by-product is oxygen. Hence, there is no deleterious effect on the concrete or cementitious properties of the ash when mixed with cement. In addition, as the reactant is administered in a gaseous form there is less risk of poor dosing rate or coverage leading to quality control issues. With the present methodology, once the correct dose is established from tests on the ash initially, the method is not prone to the "hit and miss" syndrome with liquid injection or spray methods of applying chemicals. These systems lead potentially to downstream chemical component issues in the concrete mix.

The ionized air can be generated through a device, which for example, has planar or concentric arrays of electrodes, without a dielectric intermediary to nullify the power arc or thermal discharge of the device. It does not require dried air or oxygen, which are needed for ozone—e.g. dew points of $-40°$ C. for example. The presence of the moisture is beneficial in stabilizing the plasma gas that is generated. The electrical field creates ionic oxygen species and hydroxyl ions, which are highly reactive on suitable targets. These ions effectively block the surface of the active carbon sites. This ionic gas will not significantly react with massive carbon that is present from incomplete combustion burnout of the original coal particles. Hence, negligible change in loss on ignition is effected. Carbon burnout is not the objective.

The ionized gas will furthermore progressively attack adsorbed ammonia on sites on the surface of the carbon and mineral matter and complete the reaction of this to form innocuous nitrogen and water vapor. Hence, ionized air is capable of providing a solution to the oxidation and treatment of fly ash that is presently problematic and incapable of being sold due to either ammonia or foam index issues or both of these problems.

Other types of device including those with dielectric barriers and corona discharge or pulsed mechanisms can also generate ionized air. It is important that the excitation voltage and frequency, with the water vapor present, lead to ionized components, free radicals and hydroxyl ions, which take part rapidly in carbon surface reactions. Some of these are said to be at least two orders of magnitude more powerful than molecular ozone as reacting species.

The ionized air or ionized oxygen is not the low-level or background ionized air that is found frequently in domestic products for allergy or dust treatment. These devices have insufficient energy level to bring about the necessary reactions. This product is made from a high frequency wave. It can be sinusoidal but is preferably square, and creates an alternating electrical field that has 7-20 kV of peak voltage and a rise and fall time that exceeds $10^6$ volts/sec. Tile frequency and shape of the wave generator assure that the power arc cannot develop before the voltage potential is cut-off. The repeated excitation of the atoms produces a large number of ions in the cold plasma gas. While a dielectric may still be utilized in some designs, the manufacturing costs are minimized by eliminating the tolerance issues associated with ceramic tubes or quartz dielectrics, which must be made concentric in geometry with the outer and inner electrodes. Dielectric barriers only serve to diffuse the power and prevent arcing in a plasma reactor—creating a so-called low temperature corona discharge—about $700°$ K. or less.

A discussed previously, the presence of moisture or $H_2O$ in the gas stream is actually beneficial. Many of the incoming $H_2O$ molecules form hydroxyl ions or radicals inside the plasma reaction zone. Those that do not enter into reactions with other ions or break up serve to screen other ions. The $H_2O$ molecule has an approximately 120-degree dipole, with partial charges on the two hydrogen atoms and the oxygen atom. These partial charges enable them to orient themselves as clusters around partially charged oxygen molecules and ions increasing their longevity. The gas is effectively stabilized until it contacts or is adsorbed onto the various carbonaceous film surfaces in the fly ash.

The dosing rate relative to fly ash will depend on the level of contamination and the particle size range—finer particles require higher dosage rates and certain types of fly ash are more intractable. As the aim is not to combust or react the carbon, provision of enough ions for coverage of the surface sites is the objective.

Within the scope of the present invention there are essentially three mechanisms; all operated at low temperature and all effectively surface oxidations that might be applied. In certain instances, to accommodate the variability or the intransigence of the contamination in the fly ash a combination of systems can be effective. The fly ash from a given power plant site ideally needs to be tested to determine the best sequence and level of energy for the treatment process. Hence, it may require photolytic breakdown with ultraviolet light, or microwave energy or ionized air or some combination of all three. The common thread is that the oxygen in the air is energized, largely without the conventional application of heat for example in a combustion process, leading to ionic formation and free radical reactions. Thus, ionized air alone, ionized air with ultraviolet radiation inside the contacting reactor to enhance the ionized air effect and/or microwave radiation to accelerate the reaction on the surface are all possible methods of enhancing the oxidation. Again it is emphasized that other than local surface heating of particles through reaction and radiant adsorption there is no wholesale heating of the gas stream or bulk of the mineral matter to combustion or near combustion temperatures. The process is carried out at low temperatures or substantially the mass of material is near or at ambient conditions. Some moisture in the air or the natural relative humidity of the ambient air is essential to the treatment process.

With both ultraviolet and microwave radiation, there is the need to contain these emissions within the contactor or reactor so that there is no harmful egress into the environment. However, the effect is localized and there are substantially no residual gases or chemicals that must be eliminated downstream.

Compared to ozone the power input required for the relevant amount of ionized air will be substantially less perhaps of the order of half of the power to make ozone and apply it to the fly ash. In addition, it might be expected that the capital cost of such equipment based on the principles indicated above will also be of the order of half of the ozone generator for similar duties.

Although it is possible to pass dilute phase solids in humid air through purposely designed plasma reactors and generate the ions in situ, the desired treatment effect is obtainable by first making the ionized gas stream and then contacting the fly ash particles.

The application of the ionize air or gas mixture to the fly ash is the next issue. Contact times and reactor geometries will be adapted from good engineering principles. These will include the ability to maximize the slip velocity or differential velocity of the particles relative to the gas stream—which in itself reduces the boundary layer effect and increases the overall mass transfer coefficient.

Suitable contacting devices range from pipeline or transfer line reactors, to fluidized beds, cyclonic reactors or especially toroidal fluidized beds as per U.S. Pat. Nos. 4,952,140 or 6,564,472, for example, (which have the high slip velocity mentioned earlier). In certain cases, the duty could be met with panel bed filter type configurations, packed and moving bed designs or even just baghouses adapted for the purpose. Depending on the level of contaminants, the application of ionized air may be made by injection into a silo or hopper containing the material. Here, the mixing and contacting may be poor but the residence time is extended. Contact times are a function of the device but can range from a few seconds to some minutes.

In another example of the disclosed process, solids pass through a fluidized zone or moving or agitated bed region in conjunction with a humid air flow. This zone has electrodes that effectively cause a whole set of plasma discharge reactions to occur inside the body of the gas-solid material or through the wall of the vessel to the moving particles. As this requires higher discharge potential, the voltage may be 20 KV peak to peak or more, even up to ±60 kV. The frequency can be in the region of 60 Hz or above.

Again the reactions can be considered to be oxidations of the surface of the flyash and the carbon content and involve the use of various oxygen species, ions and atomic oxygen, together with hydroxyl radical reactions due to the presence of the water vapor in the air stream.

In one embodiment, the reactor may be comprised of a cylindrical vessel with a central electrode and an outer (grounded) electrode made of stainless steel or woven copper cloth. The central electrode may be a solid rod or a wire. The walls of the vessel may be either a dielectric material like quartz or Teflon wrapped with a woven mesh or gauze forming the external electrode. With a dielectric wall, such as this, the rise and fall shape of the signal for the high voltage can be sinusoidal. The dielectric barrier more easily prevents short-circuiting than when the dielectric is absent. But a dielectric-free design is possible with a different electrical circuit design. An alternative reactor design is to have a solid steel wall, without a dielectric, such as stainless steel that is pulsed. The design of the electrical circuit requires higher switching slope-effectively a higher rate of rise and fall time—to prevent shorting and is better served with a pulse or a square wave.

The vessel may be a bubbling fluidized bed. The fluidization of the flyash is achieved with velocities typically in excess of 4 cm/sec having regard to the particle size range for many ashes and preferably greater than 10 cm/sec superficial velocity. The fluidizing gas, which is humidified air, passes through a porous plate or a perforated disk having fine holes. The design of the particle—fluid flow conditions for this reactor are subject to the typical procedures and design rules for most fluidized beds. The solids flowrate into and out of the system is related to the fluidized volume so that the residence time of the majority of the particulate matter is sufficiently long to effect the desired reactions and change in the state of the surfactive-carbon within the flyash. As the solids are actually integral to the plasma discharge zone there is a tendency for a reduction in the residence time when compared with the external methods of treatment, described earlier. However, many of the reactions and resulting surface effects are empirical and a degree of testing is essential. The fluidization requires that the gas flow is upward through the solids. Some very fine solids migrate or elutriate out of the vessel with the gas stream. As these tend to be the smaller particles, the gas phase contacting of these particles can take place quite rapidly in the freeboard above the fluidized bed or in the gas transit to the particulate collection equipment. Here, the excess ions are used up and reacted with this additional fine surface.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
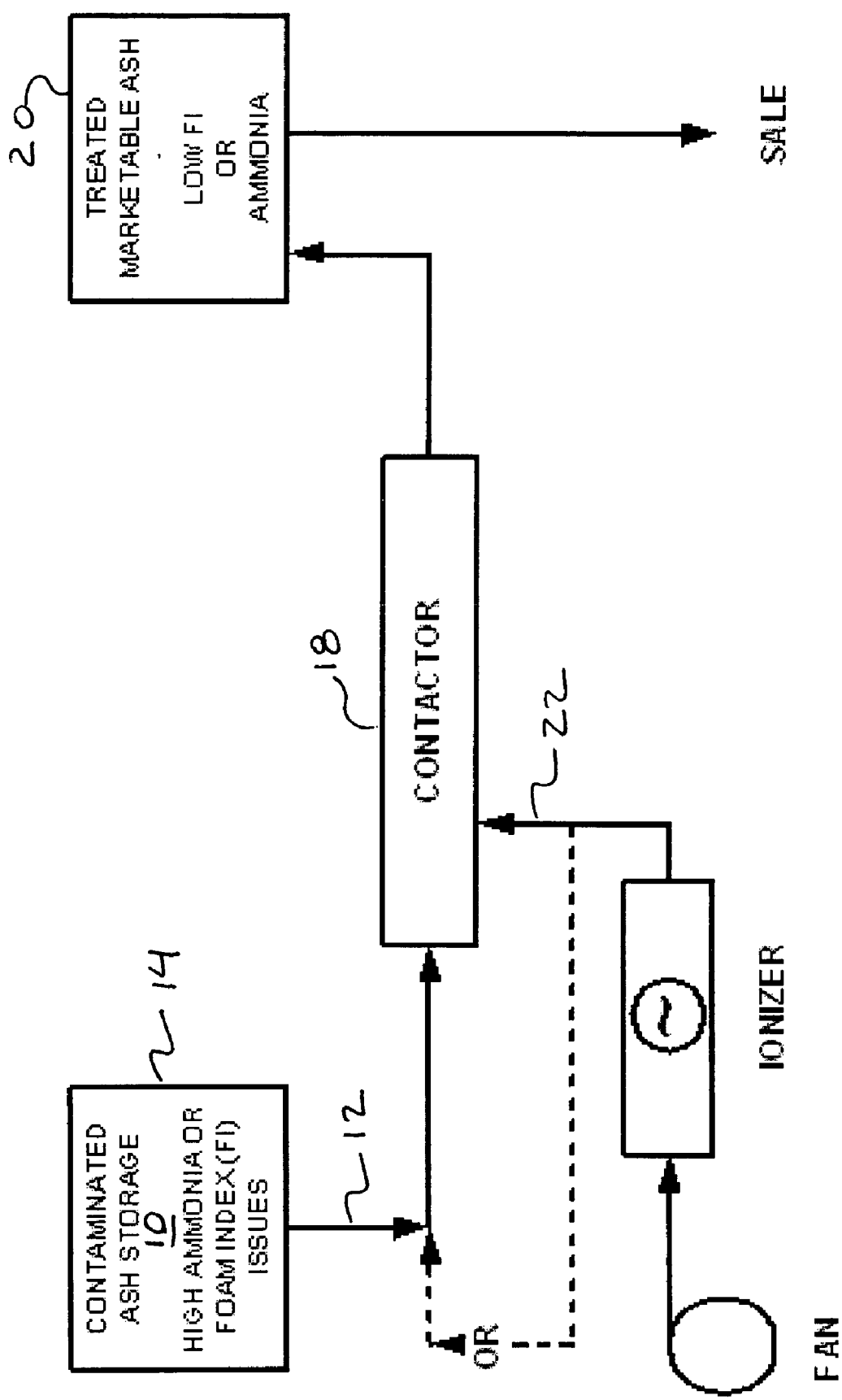
FIG. 1 is a flowchart of a preferred example of the disclosed invention.

Turning now to the accompanying drawings, it will be understood that FIG. 1 indicates the conveyance of particulate fly ash 10 in a gas stream 12 from a feed hopper or silo 14, which contains the fly ash containing carbon to be treated, through a contactor or reactor 18 to a product hopper or silo 20. Generally, an ionized gas 22 can be an additive to the air stream that is conveying the fly ash. In certain cases, it may be appropriate to make all the ionized gas present in the conveying stream itself rather than by admixture. This is shown in FIG. 1 as the "or" case 24.

Figure 2:
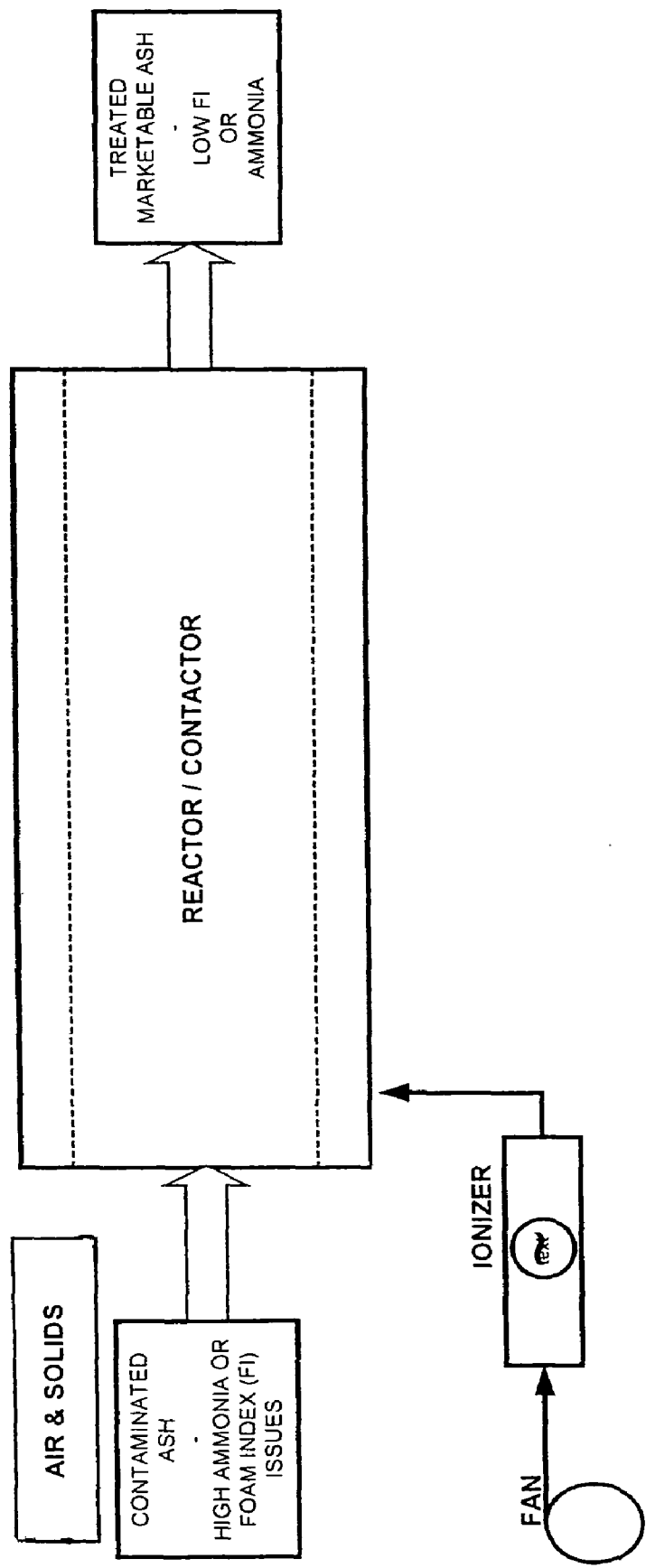
FIG. 2 is a flow chart of another example of the inventive steps disclosed here.

FIG. 2 shows the ionizer application with a fan delivering air through the energized zone 30 to the annular zone 32 of the reactor 18, carrying air and particles in at one end and out at the other. Although not shown here, it is also possible to design the ionizer with streamlined internals for actual passage of the solids in dilute phase through the reaction zone. In this case it is again important to have humidity in the transport air or gas so that the relevant species can be formed and interact heterogeneously with the fly ash surface. Hence, the plasma reactor itself and the contactor might be one and the same device, provided the solids are administered in a dilute or finely distributed phase.

Figure 3:
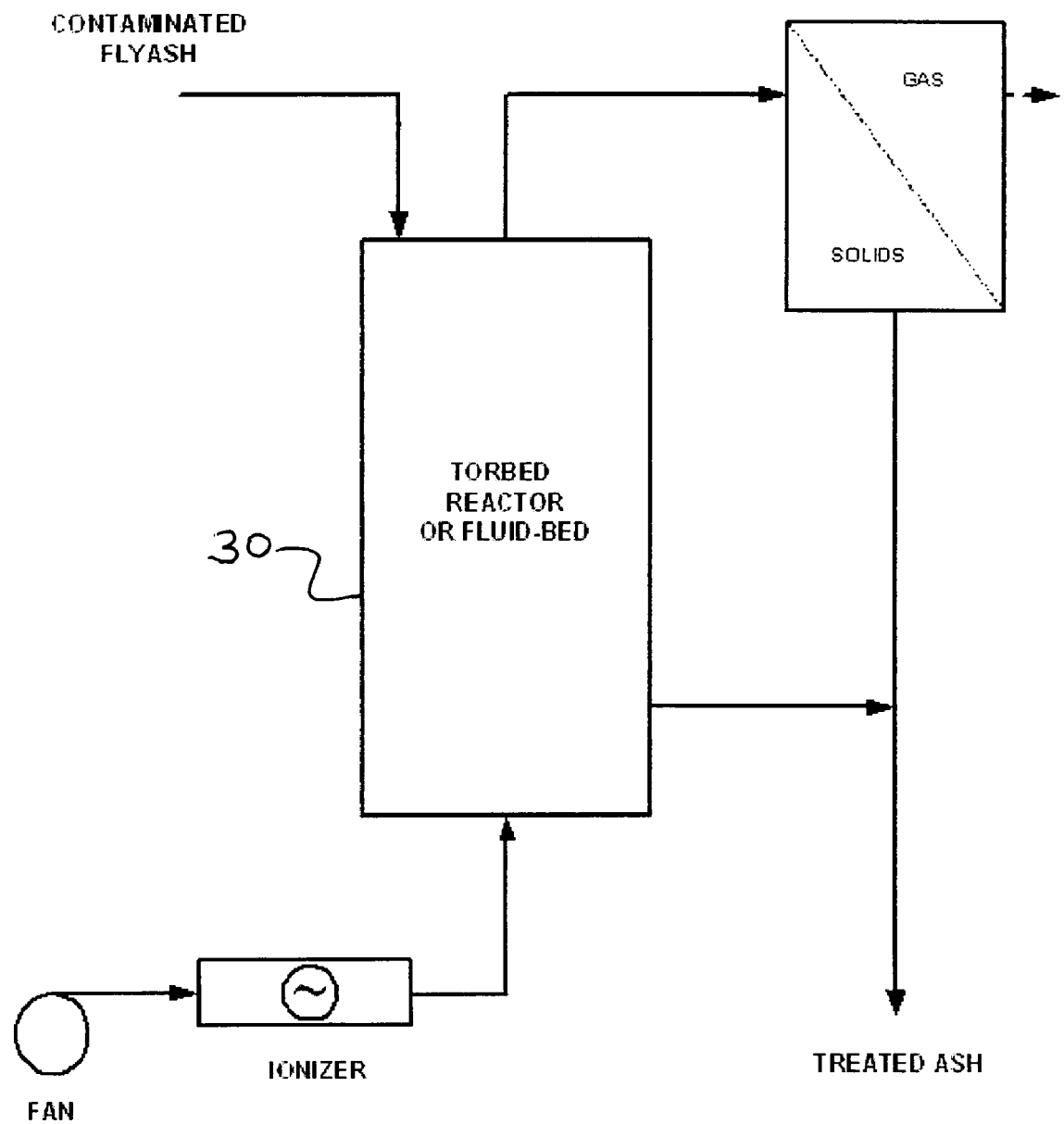
FIG. 3 is yet another example of the inventive steps disclosed here, the process being carried out through a fluidized-bed reactor of the type sold under the Torbed trademark.

FIG. 3 depicts a reactor for improving the contact time or mixing of the gas with the solids through the agency of a fluidized bed or a TORBED® reactor 40. (TORBED is the registered trademark of Mortimer Technology Holdings Ltd., UK). This method of contacting has low pressure drop and high mass transfer coefficient between gas and particle. Either methodology has advantage where there is a need for extended residence time.

Figure 4:
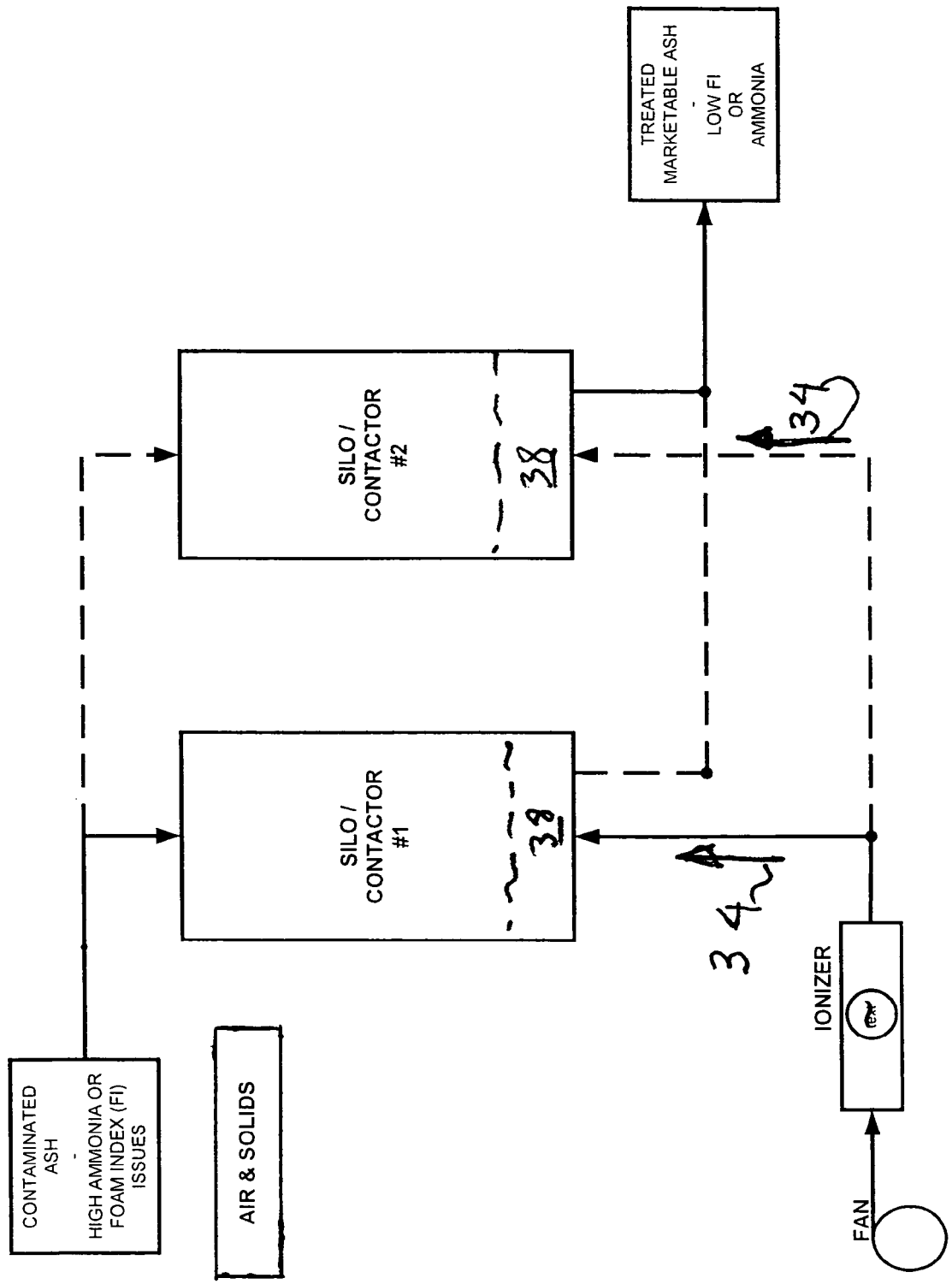
FIG. 4 is an example allowing for multiple reactors.

In other instances, ionized air could be applied direct to a silo alone or in addition to a transferring reactor or contactor delivering to the silo. FIG. 4 shows the silo method of implementing the proposed method of treatment. This applies to situations where there is a need for even more residence time for contact. Two silos 32 are shown adapted for passage of ionized gas 34 from the bottom 36 upwards through the packed bed of ash 38. Ionized gas is introduced as ash is fed counter-currently into the silos. The silos are cycled to treat material prior to discharge to truck or rail car.

Figure 5:
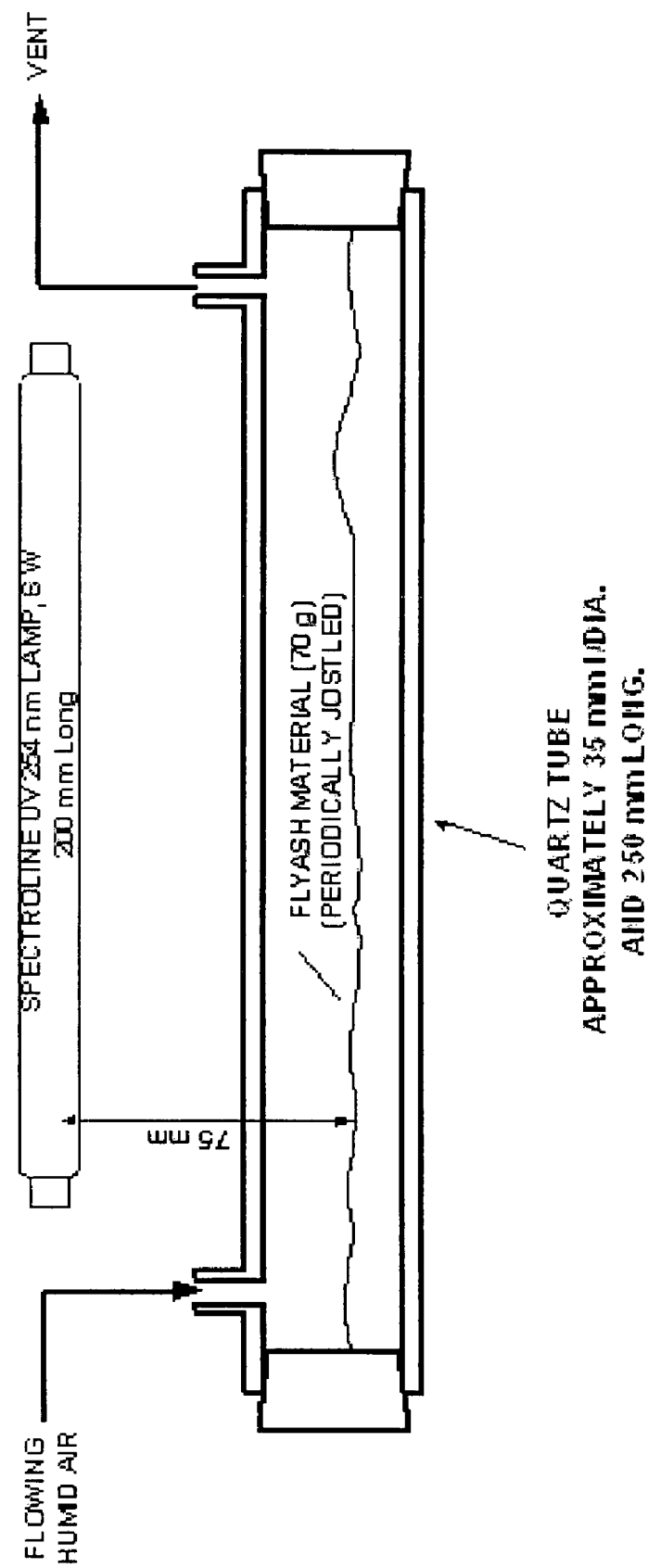
FIG. 5 illustrates a UV quartz reactor that may be used with the disclosed system to add exposure of ultra violet radiation to the fly ash.

An experiment was carried out to determine if ultraviolet would effect ammonia breakdown reactions destroying ammonia compounds on fly ash. "Ultraviolet" covers a range of wavelengths ranging from short wave 254 nm to 312 nm, medium wave, to 365 nm, long wave, with the short wave being the most effective for rupturing of C—H bonds. Because N—H bonds have similar molecular bond energy it was thought that 254 nm wavelength UV might be effective at rupturing the bonds. The presence of humid air was thought to be advantageous due to the potential for formation of additional oxidizing species that are necessary for correction of foam index. The experiment therefore involved a sweep of humid air while the fly ash was irradiated. Being a surface reaction, an elongated geometry of reactor with shallow layer of fly ash was selected as shown in FIG. 5 below.

The mechanism for ultraviolet treatment is postulated to involve ammonia, as an adsorbed gaseous species only, and its breakdown into nitrogen and hydrogen due to the photolytic action:

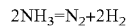

$$2NH_3 = N_2 + 2H_2$$

In the experiment, the uv light was operated intermittently on and off. During the off periods the fly ash was shaken to expose fresh material surface. With five periods of shaking, the sum of the "on" periods totaled 15 minutes and was therefore represented the total exposure time.

Exposure to ultraviolet light, UV-C at 254 nm, and 6 watts of power with 3 lpm of 50% RH airflow successfully produced a low ammonia level of 13.5 ppm in a C-ash having an untreated level of 121.5 ppm. It simultaneously had a foam index reduction from 95 to 75, (21%).

Figure 6:
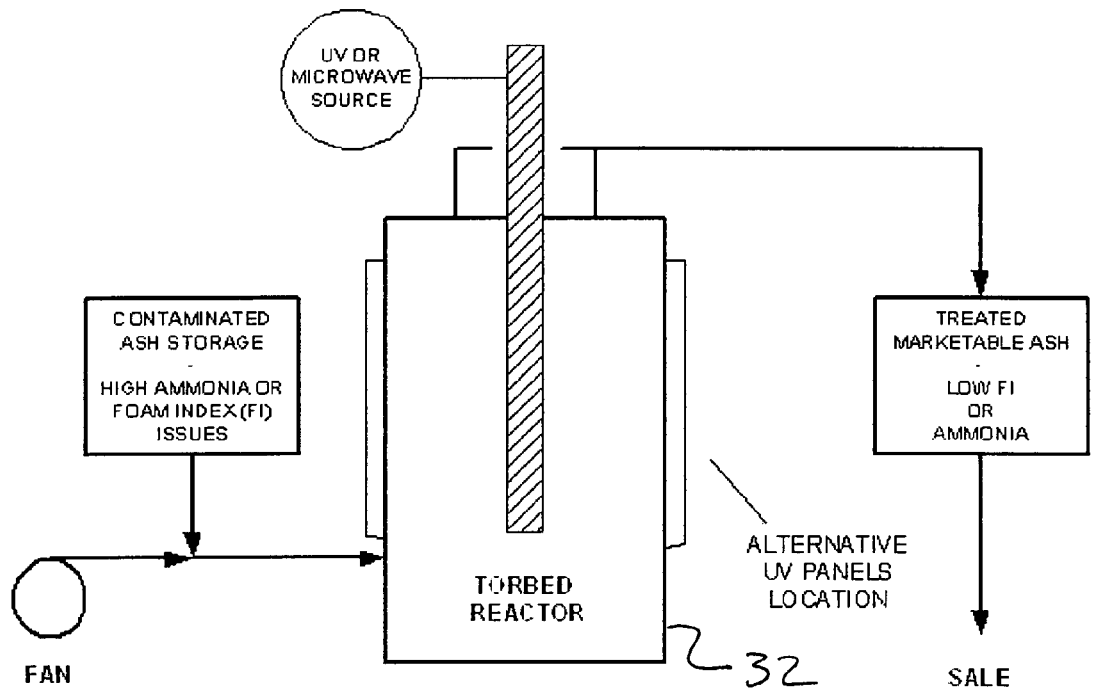
FIG. 6 illustrates the use of ultraviolet radiation in a Torbed® type reactor.

FIG. 6 depicts the in-situ application of ultraviolet radiation introduced down the center of a TORBED reactor or alternatively through uv-transparent windows embedded in the sidewalls, (as an example of a preferred embodiment). The reactor alternatively could have a microwave system with a wave-guide positioned internal to the reactor to achieve the same effect and may or may not have a separate external generating source of ionized air. The diffuse cloud of particles that is generated inside this type of reactor is ideal for the radiation and mass transfer.

Unlike ozone, no significant residual breakdown equipment for excess gas or ionized species is envisaged as the high surface area of particulates and the heterogeneous reactivity of the species is likely to utilize the majority of the gas. It is however possible to provide for the eventuality of a small amount of breakthrough with a fabric filter containing some activated carbon or even manganese dioxide—operated at ambient temperatures.

An objective of the present invention is to simplify the application and hence the cost of the system so system arrangements where the ionized air equipment becomes a simple add-on are a substantial benefit in limiting the overall cost of treating the fly ash.

Figure 7:
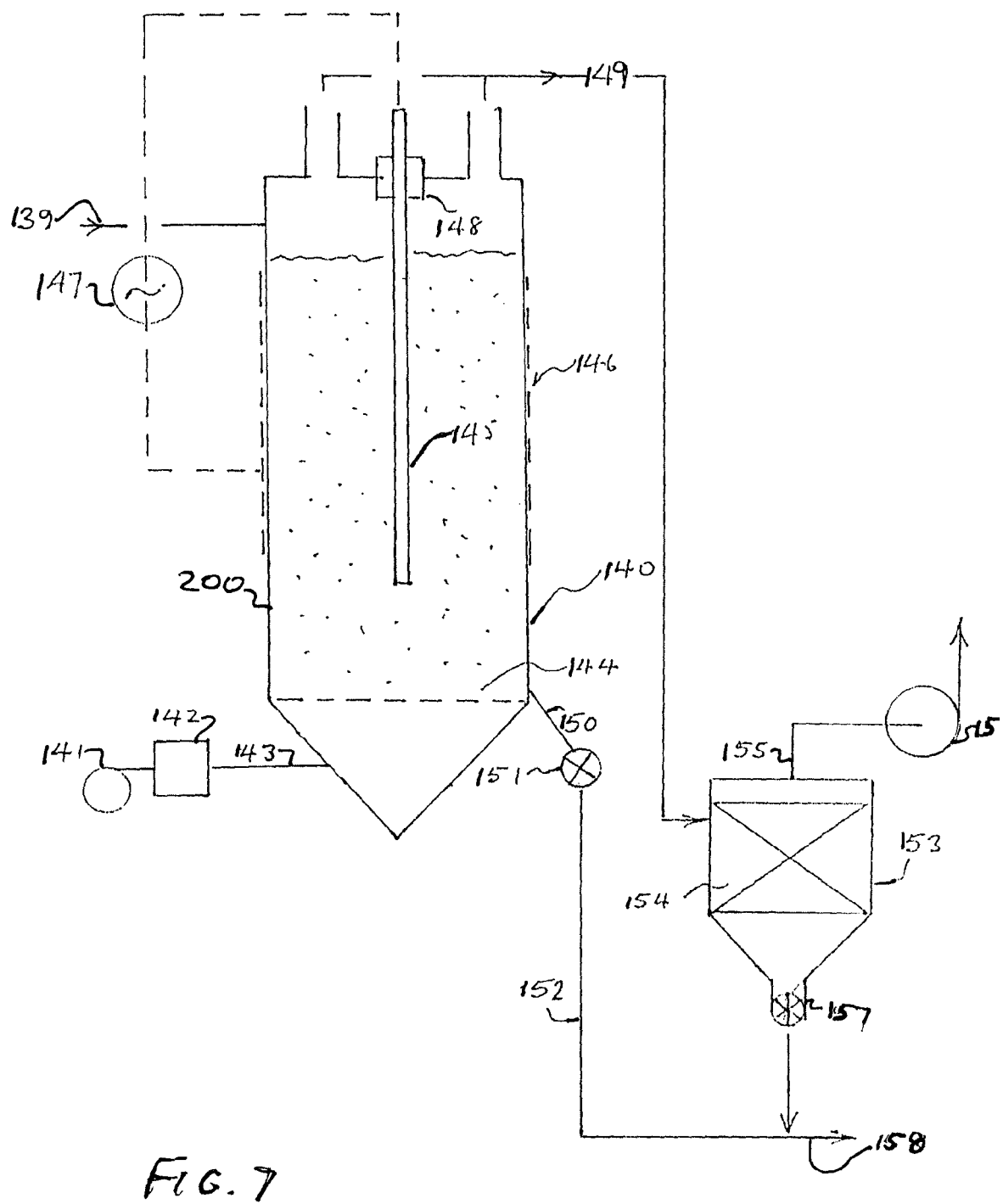
FIG. 7 illustrates an embodiment of a plasma reactor used to treat the fly ash in accordance with the principles taught herein.

In FIG. 7, a vertical cylindrical fluidized bed vessel 140 represents a plasma reactor 200. The plasma reactor 200 has a feed port for solids, 139, that introduces material at the top of the vessel 140. Air is passed via a fan, 141, through a humidifier, 142, into duct, 143, serving the fluid bed. A perforated plate or porous diffuser, 144, provides distribution of the air and sufficient pressure drop to assure the even fluidization of the material in the bed. The high voltage switching circuit is made between the inner electrode, 145, and the outer perforated metal or gauze electrode, 146 and is driven by the high voltage switching circuit, 147. The inner electrode passes into the fluid bed vessel through an insulator, 148. The level of solids and hence the retention time are kept constant by control of the rotary valve, 151, located on the outlet, 150. The pressure drop of the bed or the level itself at the top can control the solids flowrate. It is also possible to arrange for the solids to be introduced at the bottom of the bed via, for example, a screw feeder and then simply overflow at the top without any level control, as such. The vessel working volume—depth for a given diameter—effectively determines the residence time of the solids for treatment. A discharge pipe, 152, delivers the treated solids to a conveying system represented by 158. This could be a vibratory tube, screw conveyor, drag link or pneumatic conveyor.

The gas exiting the fluid bed via duct 149 may have fine material contained in it that needs to be recovered. This gas is drawn through a duct 155 and a bag filter 153 by an induced draft fan 156. In the filter, the solids are separated from the gas by fabric filtration media 154, selected for the temperature, particle size, and permeability that is required. Disentrained solids drop into the base of a hopper and pass out to the conveying system through an air lock valve 157. These solids meet those processed through the reactor. These solids are conveyed together through any one of a number of means, such as screw conveyors or drag link conveyors, represented by 158 to final treated ash collection.

Figure 7A:
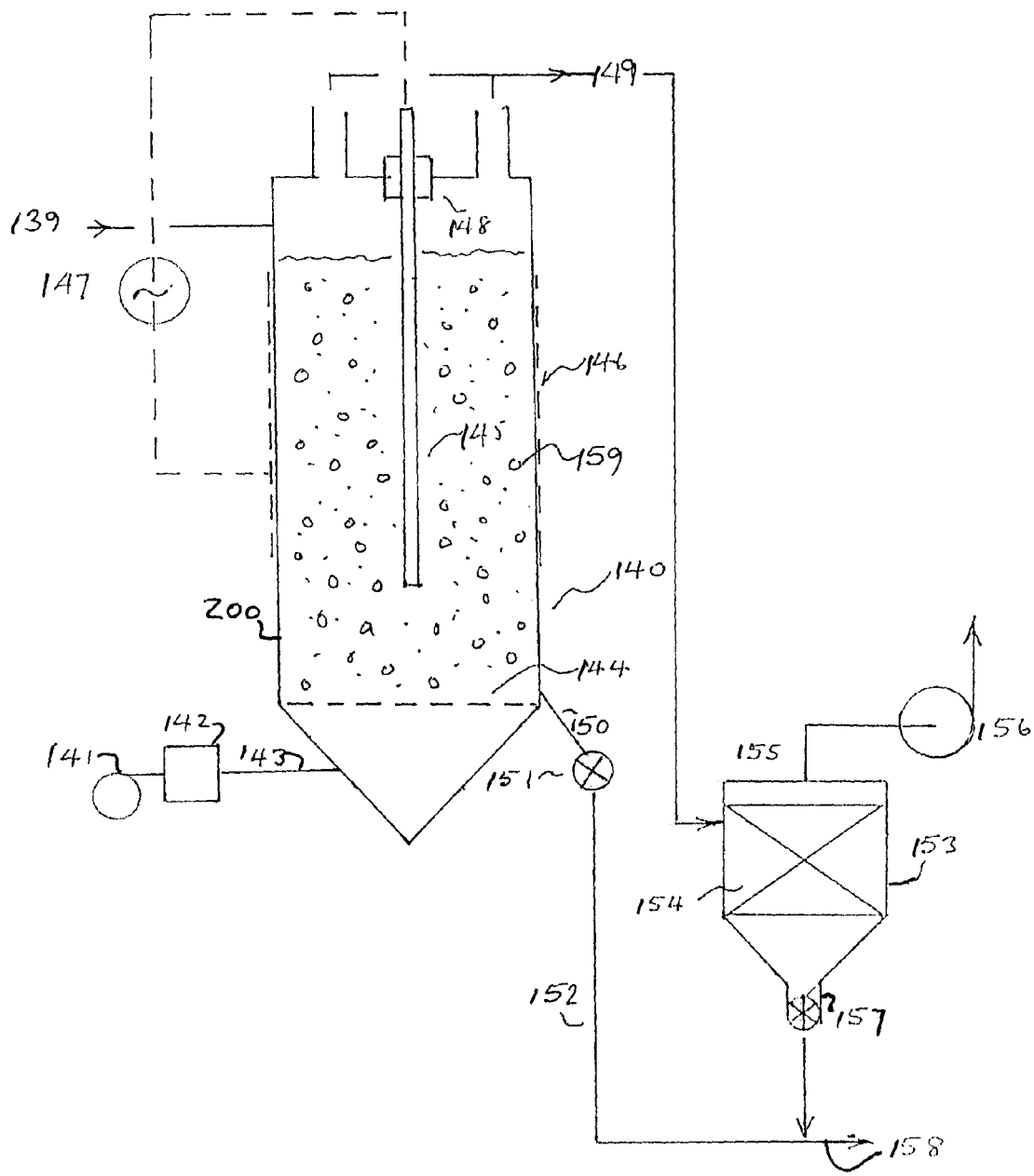
FIG. 7A illustrates an embodiment of a plasma reactor used to treat the fly ash in accordance with the principles taught herein, the example illustrating the use of dielectric beads.

In FIG. 7A, the design is similar to that of FIG. 7, except that the fluidized bed also contains a number of dielectric beads 159 made of a material like barium titanate (or glass) interspersed throughout. These are larger than the fly ash material but small enough to circulate with the majority of the bed material or they can be larger still and form a partial packed bed with the fine material interspersed and fluidized between them. The beads act like lenses and serve to concentrate the electrostatic field into the flowing fly ash solids. The discharge pipe 150 has a coarse perforated grid (not shown) at its inlet—the grid perforations are large enough to facilitate flow of the fine solids but not the dielectric beads so that these are retained in the vessel.

In another configuration, the gas and solids are contacted in a moving bed which has a central electrode and an outer electrode assembly. The flow of solids is generally downward under gravity being fed at the top and discharged at the bottom. The residence time for the solids overall in the system is determined by the dimensions of the vessel, the packing density of the particles in their moving state and the feed rate. Varying the flow rate of solids into the vessel, so as to maintain the level constant at the top is an easy way of controlling the residence time. The flow of humid air may enter the vessel at the bottom in countercurrent fashion or enter at the top with the solids and travel co-currently down the reactor with the solids. A vibrating central cone at the base causes the flow of solids down the reactor. A rotary valve, other vibratory system or air slide could be used to move and aid the flow in a similar fashion, or indeed the whole vessel could be vibrated to achieve this end.

The electrodes are arranged, as for the fluid bed. A central electrode, which is insulated from the walls and the reactor itself, operates at high voltage. The outer electrode consisting of a cylindrical gauze or perforated metal structure, being grounded, completes the circuit.

Figure 8:
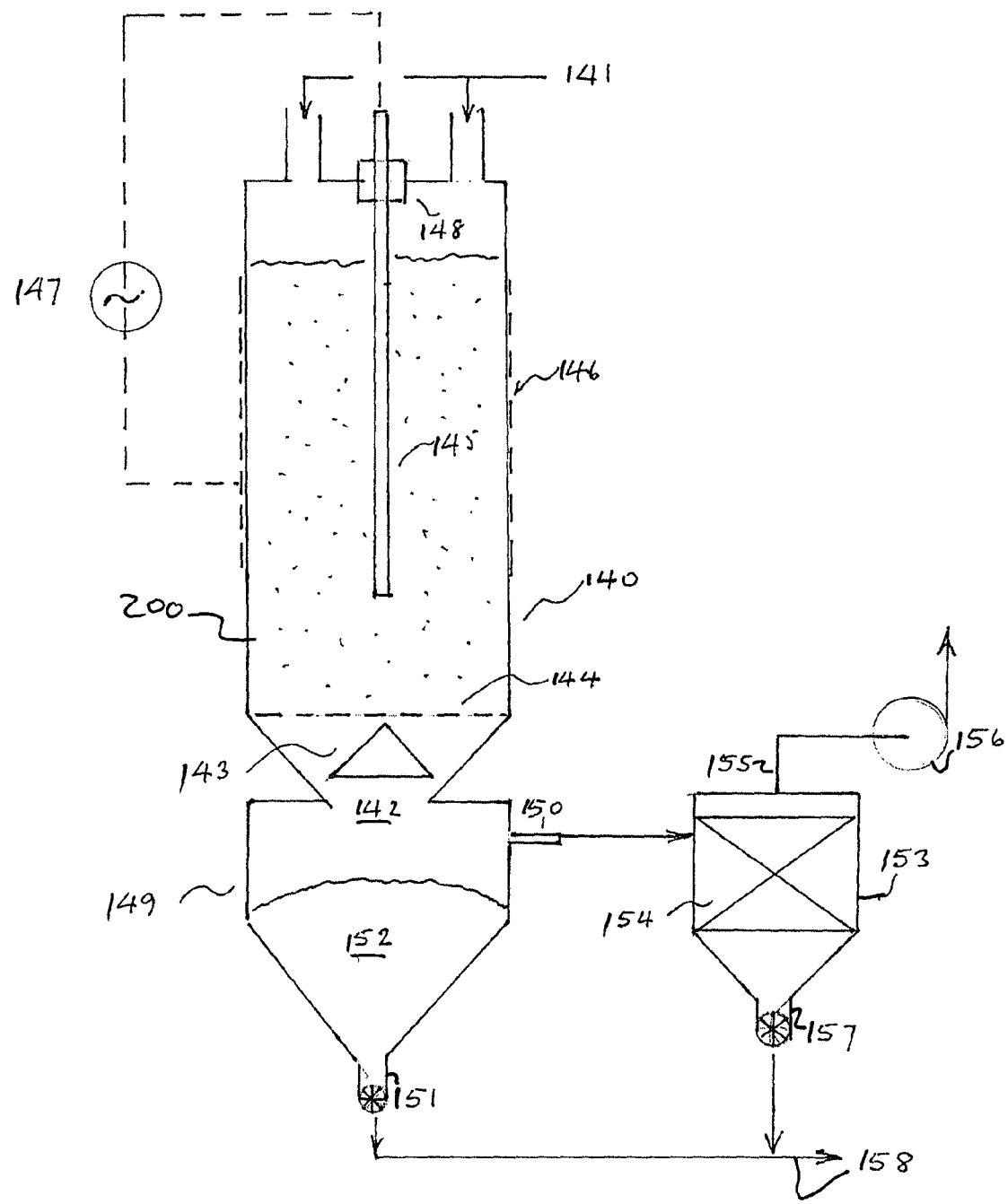
FIG. 8 illustrates the use of a plasma reactor that includes a moving bed.

This type of plasma reactor—a moving bed arrangement—is depicted in FIG. 8. It consists of a vertical cylindrical vessel 140. This has two entry ports at the top 141, each designed to carry both humid air and the solids to be treated. The base of the vessel has a control throat 142, which has a conical plug 143 that can be adjusted up or down to increase or decrease flow and is vibrated. A grid 144 serves to assist in keeping the flow path uniform across the whole cross section (plug flow). The high voltage switching circuit is made between the inner electrode 145 and the outer perforated metal or gauze electrode, 46, and is driven by the high voltage switching circuit 147. The inner electrode passes into the vertical cylindrical vessel through an insulator 148. The co-current gas flow and solids are discharged through the throat 142 into an expanded chamber beneath, where the gas can disengage via outlet 150. Treated solids 152 collected in this vessel 149 are discharged periodically or continuously through a rotary valve 151. The exit gas is processed to remove solids through filter bags represented by 154, inside a bag filter 153. The gas is passed to atmosphere through an outlet duct 155 and fan 56. At the base of the bag filter 153 there is a discharge rotary valve 157 where discharged solids meet those processed through the reactor. These solids are conveyed together as described previously for the fluid bed configuration through a conveying system, 58, to final treated ash collection.

Figure 8A:
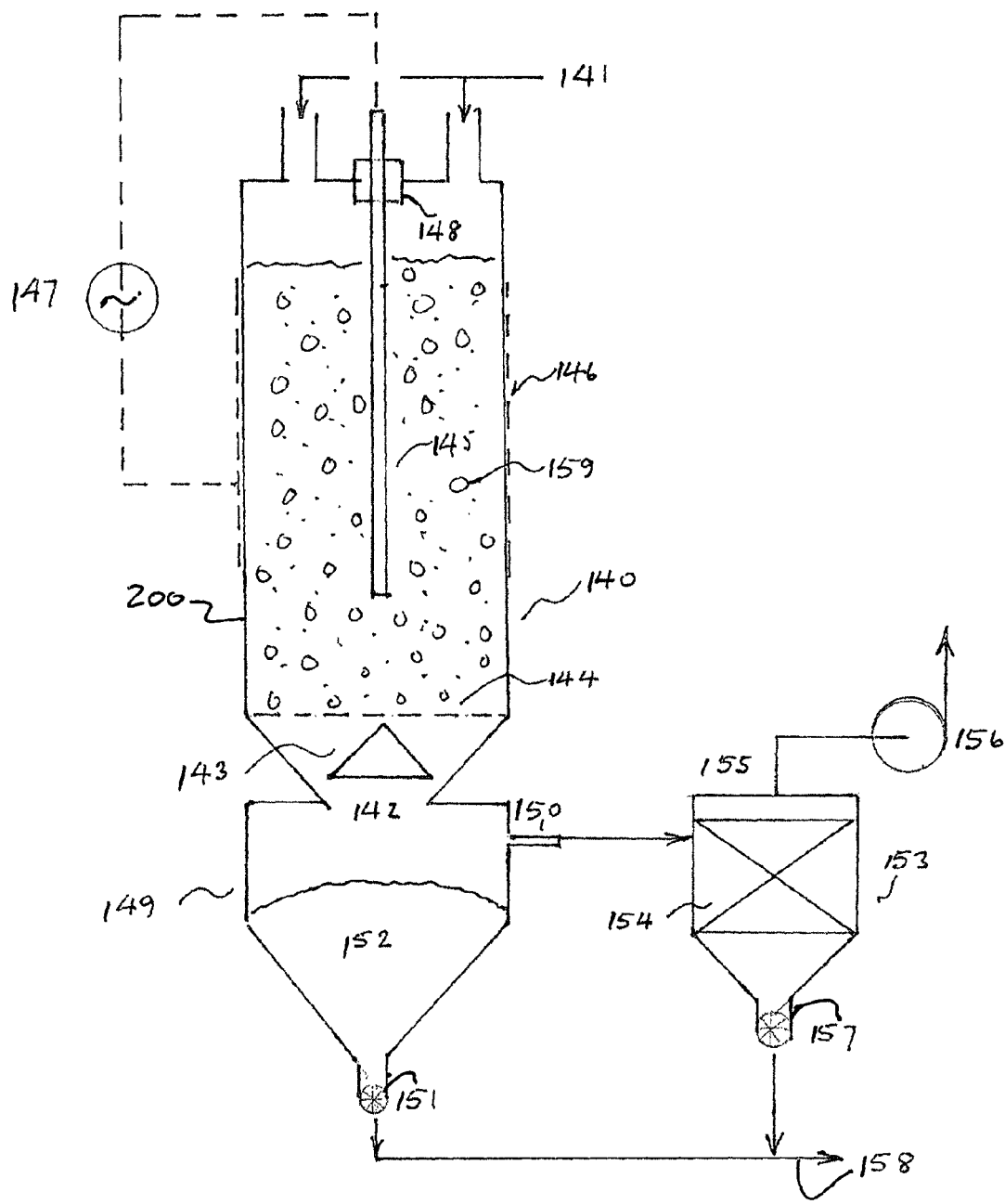
FIG. 8A illustrates the use of a plasma reactor that includes a moving bed and dielectric beads.

In FIG. 8A, the design is identical to that of FIG. 8 except that, inside the body of the reactor, there are a number of dielectric beads 159, which may be made of barium titanate (or glass) interspersed randomly throughout the vessel or as a packed bed. As described before, these act like lenses and serve to concentrate the electrostatic field into the flowing fly ash solids. The latter can pass through the perforated plate 144, at the base of the unit due to the vibration of plug 143. The dielectric beads, on the other hand, are larger than the grid perforations and preclude these exiting the reactor.

Figure 9:
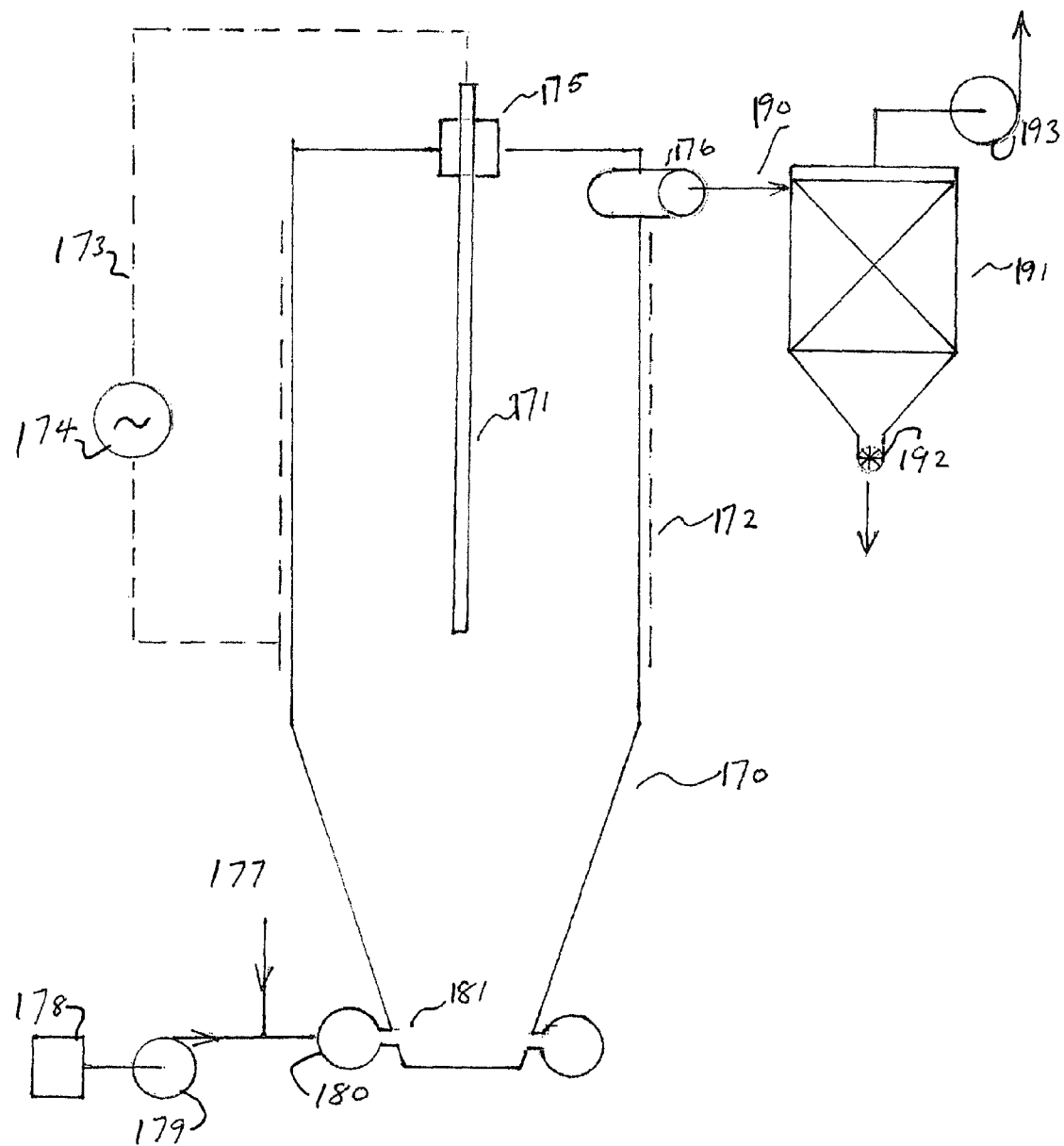
FIG. 9 illustrates the use of a reverse-operated cyclone with the plasma reactor.

In FIG. 9, a reverse-operated cyclone 170 is shown. This has electrical features in common with the earlier examples, such as the central electrode 171 entering the vessel through insulator 175. The circuit is driven by the pulsed high voltage driver 174, making electrical connection with external electrode 172. As noted previously, the walls of the vessel may be a dielectric material like Teflon®, which serves to prevent short circuiting. Alternatively, they can be metal Such as stainless steel and no dielectric barrier then exists between the electrodes other than the internal media. Air is drawn through a humidifier 178 by fan 179. Solids are conveyed into the gas stream from feed system 177—which could be a screw feeder or rotary valve feeding a source of untreated fly ash. The combined flow passes into a distributor 180, having a set of pipes 181 entering tangentially at the bottom of the truncated cone of the vessel. It is also possible to feed the solids into the vessel, separately from the humidified air, and at a different location but near the bottom of the vessel.

The flow of solids and gas is upwards through the reactor with all the solids being swept around and out with the gas. The solids residence time is less that with the other options above but is prolonged over the gas phase by virtue of centrifugal force generated by the high velocity swirl of the flow. The gas exits tangentially through off-take 176. Another option for handling the exit gas is a ring-collar outlet that surrounds the central electrode but is far enough away from it to prevent any shorting. The duct 90 conveys the whole gas and solid flow to separation in a filter unit 191 that is similar to that described previously. The system is aspirated by the induced draft fan 193, which discharges to atmosphere. The treated product solids are discharged via a rotary valve 192 to end use or sale.

Although not shown specifically in the diagrams, a Torbed® reactor (indicated earlier) can serve the process duty instead of a cyclone. It has the benefit of a longer solids residence time than a cyclone but less than a moving or fluidized bed.

The designer has to be cognizant of the different residence time requirements of the various types of reactor. The cyclone and the Torbed® reactor have a tendency to require higher gas to solids ratios, than the other types of reactor. However, the dispersed nature of the gas-solid envelope results in the plasma discharging through a film or cloud of the solids and gas, which can be very effective.

Figure 10:
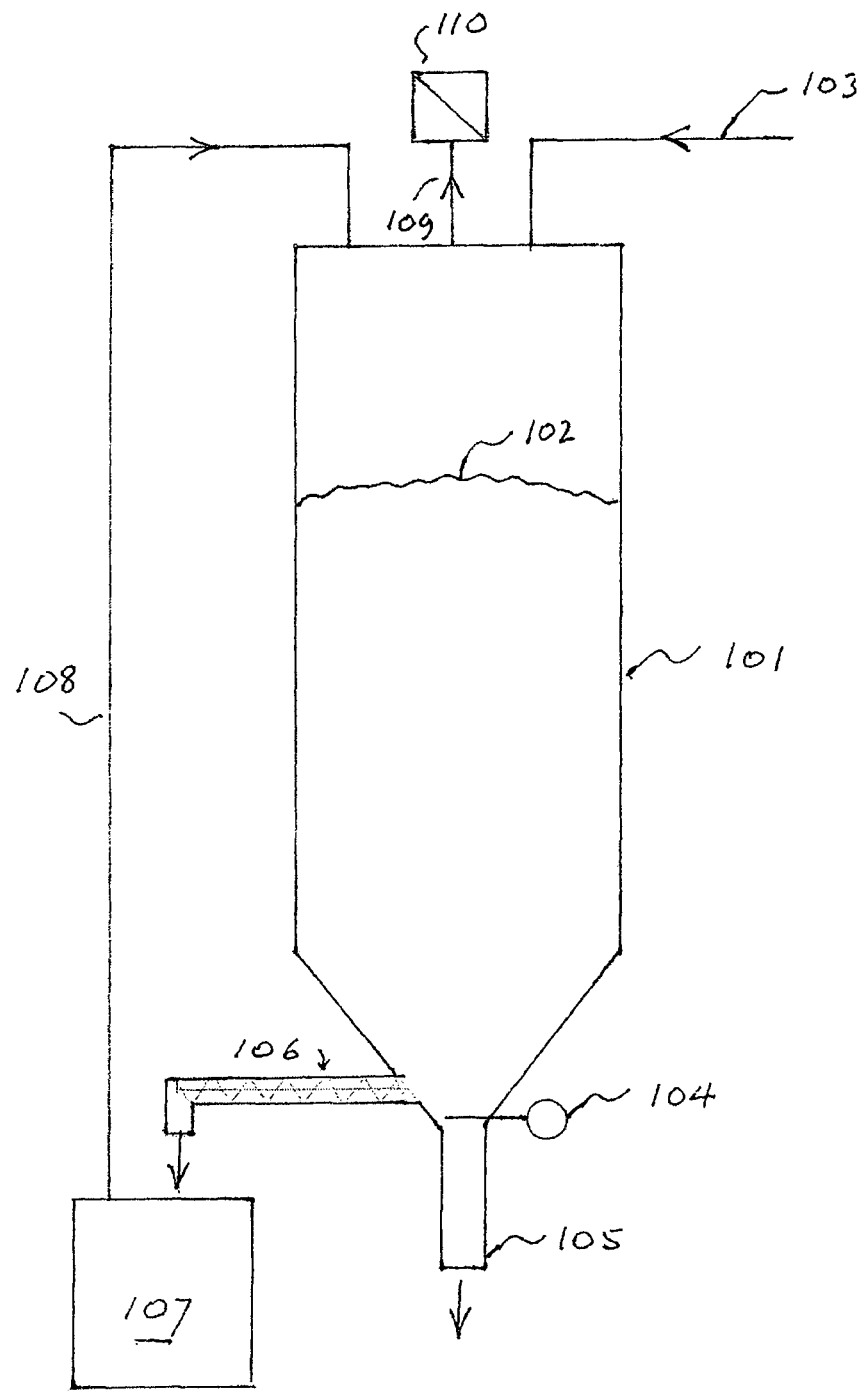
FIG. 10 illustrates an example of a silo designed for treatment of fly ash at the power plant location.

FIG. 10 illustrates a power plant fly ash silo and an indicative method of on-site treatment. Silo, 101, may be one of many to serve the fly ash production of a sizeable coal burning power plant. The normal operation of this is for collection of the dust from electrostatic precipitators via conveying line, 103. This is most often done pneumatically. The solids discharge into the silo and the conveying air is discharged through a duct, 109, to a filter, 110. When the silo is filled the flow is switched to a second or third silo as appropriate for the ash production. If the flyash is directly marketable, it is discharged without treatment through a spigot, 105, to a waiting tanker truck. Multiple truck fills are possible with a large capacity silo.

If the ash is "off-specification" for direct sale because it has a high foam index, for example, on-site treatment may be considered. In this case assuming a near-full silo, 102, diverter valve, 104, may temporarily isolate the discharge to trucks and any new ash would be diverted to a second silo. A screw conveyor, 106, or other means is needed for controlling the discharge rate of the ash from the silo to the treatment system. The box 107 represents this treatment system. This process could be implemented in any one of the aforementioned types of reactor. The principle is that the flow would remain isolated from truck discharge for a period of time during which the silo contents are re-circulated through the treatment system and the beneficiated solids conveyed back to the silo by line 108. The time the silo is off-line would depend on its hold-up capacity, the treatment rate and the condition of the ash—but essentially, as a first order estimate, one turnover of the silo contents through the treatment process is necessary.

There are obvious integrations of this circuit that can be made. For example, the conveying line 108 may represent the exit from the cyclone or Torbed® reactor, where all the gas and solids pass together, and the bag filter equipment outlined in these examples could be replaced by the existing silo bag filter unit 110. It is also possible that either of the fluid or moving bed arrangements might utilize the silo filter for ultimate gas solid separation, in which case the vertical transfer line 108 would represent a bucket elevator for the solids. It is also conceivable that the re-circulation to the silo, via line 108, is not required in certain instances and that the treatment unit 107 can handle the fly ash as fast as it is discharged from the silo—effectively en route to the truck.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A method for treating carbon-containing fly ash to reduce the adsorption capacity of the contained carbon, the method comprising:
    providing a gas stream containing air;
    providing an amount of fly ash containing carbon having an adsorption capacity;
    providing a plasma reactor having an inner electrode that is surrounded by outer electrode;
    placing the carbon-containing fly ash between the outer electrode and the inner electrode; and
    passing the gas stream containing air through the carbon containing fly ash while introducing an alternating voltage between the outer electrode and the inner electrode to create a plasma from the gas stream containing air and exposing the fly ash to the plasma to expose the carbon to the plasma to reduce the adsorption capacity of the carbon.

2. The method of claim 1 wherein said air has a high relative humidity, and said fly ash contains ammonia, so that the ammonia and water react with the fly ash to create an oxidizing species that further reduces the adsorption capacity of the carbon.

3. The method of claim 2, wherein said plasma is at a temperature below that required for oxidation of substantial amounts of the carbon.

\* \* \* \* \*